United States Patent [19]

Nishibayashi et al.

[11] 3,939,021

[45] Feb. 17, 1976

[54] PROCESS FOR PRODUCING ARTIFICIAL LEATHER

[75] Inventors: Yoshifumi Nishibayashi, Sen-nan; Atsushi Shimizu, Takaishi; Yasuhiro Shiga, Osaka; Kenji Okabe; Ken-ichi Baba, both of Sen-nan, all of Japan

[73] Assignee: Toyo Cloth Co., Ltd., Osaka, Japan

[22] Filed: Dec. 18, 1973

[21] Appl. No.: 425,864

[30] Foreign Application Priority Data

June 16, 1973  Japan.................................. 48-68113

[52] U.S. Cl............. 156/78; 156/239; 260/2.5 AH; 260/2.5 AY; 260/77.5 AT; 264/45.8; 264/46.4; 264/54; 428/90; 428/91; 428/172; 428/245; 428/425; 428/904

[51] Int. Cl.² B32B 31/14; B32B 05/20; B32B 05/28

[58] Field of Search ........... 156/231, 232, 237, 239, 156/241, 230, 78; 161/DIG. 2, 406, 190, 160, 161; 260/2.5 AH, 2.5 AY, 77.5 AT; 428/904, 172, 425; 264/45.8, 46.4, 54

[56] References Cited

UNITED STATES PATENTS

| | | |
|---|---|---|
| 3,000,757 | 9/1961 | Johnston et al......... 161/DIG. 2 UX |
| 3,393,106 | 7/1968 | Marrinan et al.................... 156/232 |
| 3,537,947 | 11/1970 | Brazdzionis....................... 156/78 X |
| 3,547,753 | 12/1970 | Sutton............................. 156/230 X |
| 3,639,188 | 2/1972 | Vogel.................................. 156/231 |
| 3,650,880 | 3/1972 | Tieniber.......................... 156/231 X |
| 3,748,288 | 7/1973 | Winkler et al. ............... 260/2.5 AH |
| 3,827,930 | 8/1974 | Sutton............................. 156/230 X |

*Primary Examiner*—Douglas J. Drummond
*Assistant Examiner*—Thomas Bokan
*Attorney, Agent, or Firm*—James C. Haight

[57] ABSTRACT

Artificial leather is produced by applying a dope comprising urethane prepolymers containing terminal isocyanate groups, an amine catalyst and a foam stabilizer onto a releasing carrier sheet, exposing the resulting coating layer to a moisture-containing gas under controlled conditions, laminating the coating layer onto a backing material and stripping off the releasing carrier sheet. The resulting artificial leather has a cellular structure of polyurethane microfoam in adhesion with the backing material and an adhesion strength of 100 to 10,000 g/cm of width.

20 Claims, 2 Drawing Figures

PROCESS FOR PRODUCING ARTIFICIAL LEATHER

This invention relates to a method for producing artificial leather. More particularly, it relates to the method of making artificial leather by transferring a polyurethane layer having a cellular structure onto a backing material.

Various attempts have been made to produce artificial leathers comprising layers of polyurethane and a backing material. However the products suffer from certain disadvantages such as insufficient mechanical strength and weather durability, inadequacy for secondary working processes or poor appearance, etc. Some of them require exposure of the semi-finished product to heat for a long period of time in order to complete the cross-linking reaction of polyurethane resins supported on the backing material. This heating is not desirable where the backing materials are made of synthetic fibers such as polyethyleneterephthalate or nylon, because the materials tend to shrink during the operation thus resulting in the formation of pronounced creases on the finished products.

An object of the present invention is to provide a method for producing artificial leather which is free from the above-mentioned disadvantages.

Another object is to provide the method which gives an artificial leather having improved abrasion resistance, scratch resistance, flexibility, weather-durability, natural leather like-appearance, and workability for the production of various articles.

Further objects will be apparent from the description which follows. According to the present invention, it has been found that the foregoing objects may be achieved by applying a dope comprising 100 parts by weight of urethane prepolymer containing about 2 to 10% by weight of terminal isocyanate groups, about 0.5 to 10 parts by weight of an amine catalyst and about 0.05 to 3 parts by weight of foam stabilizer to a releasing carrier sheet, exposing the resulting coating layer to a moisture-containing gas at an absolute humidity of from about 2 to 50 g/m$^3$ for a sufficient period of time greater than 0.1 minute to produce microfoams in the coating layer, laminating the coating layer onto a backing material while it is adhesive, allowing the laminated layer to produce a polyurethane layer having permanent adhesion with the backing material so that an adhesion strength of about 100 to 10,000 g/cm of the width of the transferred layer is obtained, and stripping off the carrier sheet therefrom. As the carrier sheet which can be employed in the present invention, conventional release papers, which may be optionally embossed, clothes and other materials or those materials having a coating of film-forming synthetic resins such as polyurethane resins, particularly those containing isophorone diisocyanate, may be mentioned. Any conventional releasing agent may be used to produce the foregoing releasing carrier sheets provided that the releasing property thereof is not affected upon heating at a temperature of 60°C to 200°C.

The urethane prepolymers having terminal isocyanate groups may be of either the polyether or polyester type and are produced by a conventional method.

Examples of such polyethers used for the production of such urethane prepolymers are; polyethyleneglycol, polypropyleneglycol, polytetramethyleneglycol, polyhexamethyleneglycol, polyoctamethyleneglycol, polynonamethyleneglycol, polydecamethyleneglycol and the mixtures thereof. The polyethers have a molecular weight of 100 to 4,000, preferably 150 to 2,000.

Examples of polyesters used are condensation products between i) diols such as ethyleneglycol, propyleneglycol, tetramethyleneglycol, decamethyleneglycol, 2,2-dimethyl-1,3-propanediol, cyclohexanediol or xylenediol, and ii) dibasic acids such as succinic acid, adipic acid, suberic acid, sebacic acid, tetrahydrophthalic acid or hexahydrophthalic acid.

Examples of isocyanates used for the production of urethane prepolymers are toluylene-2,4-diisocyanate, hexamethylene-1,6-diisocyanate, methylene-bis-(4-phenyleneisocyanate) or tetrahydronaphthalenediisocyanate.

The urethane prepolymers must contain about 2 to 10%, preferably about 4 to 6% by weight of active isocyate groups at the terminals of their molecules and the average molecular weight thereof ranges from 500 to 10,000, preferably from 800 to 3,000. Contents of the terminal isocyanate groups below 2% by weight require a prolonged reaction time and result in a very low foaming rate, giving unflexible cellular structures having thick cell walls. Contents above 10% by weight of terminal isocyanate groups result in unstable mixtures when added to the dope and tend to cause overfoaming, which makes it difficult to obtain a uniform, fine cellular structure. The urethane prepolymers may be dissolved in a hydrophobic solvent such as methylene chloride or methyl ethyl ketone for the preparation of the dope used for the present invention. The amounts of such solvent are preferably less than 25 parts by weight to 100 parts by weight of the urethane prepolymer. The use of excess amounts of solvent results in unstable foams and makes it difficult to obtain a uniform, fine structure.

The foregoing urethane prepolymers are mixed with about 0.5 to 10 parts by weight of amine catalyst and about 0.05 to 3 parts by weight of foam stabilizer to 100 parts by weight of the urethane prepolymer to prepare a dope.

The use of amine catalyst in amounts less than the above range makes the product unsuitable for practical use as an artificial leather because of its poor foaming state, low flexibility and smoothness. Use of the amine catalyst in excess causes undesirable overfoaming and a rough structure of cells in the product, and decreases the abrasion and scratch resistances.

Suitable amine catalysts are those known in the art and include, for example, triethylenediamine, N-methyl-morpholine and triethylamine.

The addition of a foam stabilizer to the dope is essential for the production of a uniform, fine cellular structure. The use of the stabilizer in amounts less than the above-mentioned range may produce cells too large in size, while excessive amounts cause bleeding thereof and a decrease of mechanical strength, particularly adhesion strength between the layers. Examples of such foam stabilizers effectively used for carring out the present invention are organo-silicon compounds such as organo-silanes, organo-halosilanes, organo-alkoxysilanes, organo-silanols, organo-siloxanes or organo-silazanes.

Before applying, the dope may be diluted with a solvent in order to adjust the viscosity thereof. The amount of such solvent or the cumulative amount of solvents, if the urethane prepolymer has already contained a solvent, is preferably less than 25 parts by weight thereof to 100 parts by weight of the urethane prepolymer. The use of excess amounts of solvent results in too large a cell size and makes it difficult to obtain a uniform, fine structure. Examples of such solvents used for this purpose are dimethylformamide, tetrahydrofuran, ketones such as methyl ethyl ketone, esters such as ethyl acetate, toluene, or methylenechloride. The use of such solvent requires a suitable means to prevent possible hazards to human beings or the environment.

Although the above mentioned urethane prepolymer, amine catalyst, foam stabilizer and solvent, if any, may be mixed by any conventional means, mixing using a one-shot mixer is most preferable. Upon mixing, conventional additives such as fillers, pigments and the like may be added to the dope. The finished dope preferably has a viscosity less than 50,000 cps and the temperature is preferably adjusted at a constant of from 10°C to 40°C by passing the finished dope through a heat-exchanger before applying it to the carrier sheet. The lower temperature of the dope causes the higher viscosity of the dope so that applying such dope becomes impossible at a temperature below 10°C. Applying at a temperature above 40°C is also undesirable because the cross-linking reaction of the polyurethane layer proceeds too rapidly to give a good cellular structure. When a one-shot mixer is used, the injection pressure may vary depending upon the quantity of dope needed but preferably is greater than 0.5 kg/cm$^2$, more preferably within the range between 2 and 10 kg/cm$^2$. A pressure of less than 0.5 kg/cm$^2$ is of no practical use because it gives dopes in different states of reaction between the beginning run and the finishing run, which may produce varying cell structures. The dope may be applied to the carrier sheet by conventional means, e.g. using such coaters as the reverse-roll coater, other roll coaters, a comma-doctor coater or other doctor coaters. The amounts of dope to be applied are not critical but the range between 50 to 400 g/m$^2$, preferably between 100 to 300 g/m$^2$ is desirable for carring out the present invention.

The coating layer thus produced is then exposed to a moisture-containing gas at an absolute humidity of from about 2 to 50 g/m$^3$ for a sufficient period of time greater than 0.1 minute to produce microfoams in the coating layer.

The exposing time $t$ (minute) is a function of the moisture content $\omega$ (g/m$^3$) and the amounts of amine catalyst $x$ (g). The time $t$ may also vary depending upon the texture of the backing material, the content of terminal isocyanate groups in the starting urethane prepolymer and the reaction temperature.

The conditions can be determined experimentally in order that the layer in the finished product possesses an adhesion strength of 100 to 10,000 g/cm of width.

In other words, these conditions are in the relation represented by the following equation:

$$2 \leq \alpha - \beta x^{1.6} t \leq 4$$

wherein $\alpha$ and $\beta$ are factors as hereinafter defined. The factor $\alpha$ varies with the nature of the backing material and may be calculated by the following equation:

$$\alpha = \log y_0$$

wherein $y_0$ is the adhesion strength (g/cm) when measured on the following standard test:

A urethane prepolymer comprising polyethylene adipate and toluylene-diisocyanate (4.5% by weight of terminal isocyanate groups, average MW=2500) is applied onto a polyester film at a rate of 100g of the prepolymer per m$^2$ of the film in the atmosphere of an inert gas by a standard applicator. The test fabric is placed on the coated surface while the terminal isocyanate groups remain unreacted and the pile is passed through a pair of rolls (10cm diameter) facing at a pressure of 1 kg/cm$^2$. The resulting material is then successively allowed to stand in an oven at 100°C at 60% relative humidity for 5 minutes and then under ambient conditions for 24 hours. The polyester film is then removed. The adhesion strength (g/cm) is measured with respect to the test piece taken from the finished product thus obtained.

The following Table 1 shows the factor $\alpha$ with respect to various fabrics. The value normally ranges between 3 and 4 as shown.

Table 1

| Material | nonwoven fabric nylon/polyethylene-terephthalate | woven fabric | | | | knitted fabric | | |
|---|---|---|---|---|---|---|---|---|
| | | polyethylene-terephthalate/rayon | cotton | polyethylene-terephthalate/cotton | | cotton | rayon/cotton | nylon |
| raising | — | no | no | yes | no | no | no | no |
| $\alpha$ | 3.90 | 3.06 | 3.48 | 3.49 | 3.50 | 3.13 | 3.30 | 3.48 |

The item $\beta x^{1.6} \omega t$ represents the rate of decrease in adhesion strength caused by the reaction of urethane prepolymer with water. The factor $\beta$ varies with the contents of terminal isocyanate groups in the urethane prepolymer, the temperature of the moisture-containing gas T (°C) and the texture of the backing material, and may be determined experimentally by measuring the decreased adhesion strength caused by the reaction with water at various predetermined conditions and then calculating using the difference between the logarithm of said strength and the value of log $y_0$ with respect to the same material. The following Table 2 shows the factor $\beta$ at various conditions as indicated.

Table 2

| Material | knitted fabric,cotton | | | plain woven fabric,cotton | | | | nonwoven fabric, nylon/polyethyleneterephthalate | | |
|---|---|---|---|---|---|---|---|---|---|---|
| terminal isocyanate (content % by weight) | 4.5 | 4.5 | 4.5 | 2 | 4.5 | 4.5 | 10 | 2 | 4.5 | 10 |
| T (°C) | 60 | 80 | 100 | 100 | 60 | 100 | 100 | 100 | 100 | 100 |
| $\beta$ | 13.3×10$^{-3}$ | 12.4×10$^{-3}$ | 11.5×10$^{-3}$ | 1.8×10$^{-3}$ | 4.7×10$^{-3}$ | 3.0×10$^{-3}$ | 15.1×10$^{-3}$ | 3.2×10$^{-3}$ | 8.0×10$^{-3}$ | 19.9×10$^{-3}$ |

The temperature of the moisture-containing gas under which the foaming and the cross-linking reactions take place is preferably between about 60°C and 200°C, particularly between 80°C and 140°C.

Conducting the reaction at a temperature either below or above this range gives unsatisfactory results. $\omega$ is, as hereinbefore mentioned, the weight of water (g) in 1m³ of the gas and is preferably within the range between about 2 g/m³ and about 50 g/cm³, particularly within the range between about 10 g/m³ and about 30 g/m³. Humidity below the lower limit will result in insufficient foaming rate (less than 1.5 times the volume of the unfoamed dope) and the finished product thus obtained is rigid rather than flexible, while humidity above the upper limit gives a product whose mechanical strength such as adhesion strength or flex resistance is too small to use as a substitute for leather.

Alternatively, the coating layer may be exposed to a gas current whose moisture content is varied regularly or irregularly. In this case, the mean value of the moisture content may be employed.

As the moisture-containing gas, any inert gas such as air, nitrogen gas and the like may be used in the present invention. The time $t$ for which the urethane prepolymer coating is exposed to the moisture-containing gas must be greater than 0.1 minute to obtain a satisfactory result and is generally within a range of 1 to 3 minutes. A time less than 1 minute causes insufficient foaming, while the reaction will reach an equilibrium for a time greater than 3 minutes and finally deterioration in terms of the adhesion strength will take place.

The foaming rate of the coating layer will lie within a range of about 1.5 to 4 times the volume of unfoamed dope to obtain an artificial leather having sufficient mechanical strength and flexibility. Furthermore, it has been found that the finished product produced by the present invention must have an adhesion strength of at least 0.5 kg/cm when it is used for the production of various articles such as shoes. These foaming rates and strengths may be obtained if the various conditions of this reaction in terms of the equation $2 \leq \alpha - \beta x^{1.6} \omega t \leq 4$ are met.

As will be seen from the foregoing description, the desired adhesion strength of 100 to 10,000 g/cm may be obtained by adjusting the cumulative quantity of water to be reacted with the urethane prepolymer containing reactive terminal isocyanate groups. The resulting foamed polyurethane layer is then incorporated with a backing material to produce a permanent adhesion. Examples of backing materials which may be employed in the present invention are woven fabrics, knitted fabrics, nonwoven fabrics, papers, plastic films or the like. These materials may be subjected to a pretreatment such as coating with synthetic resins, softening, impregnation, primary coating, raising, flocking or the like. With raised or flocked materials, the polyurethane layer is placed preferably on the untreated surface of the material, though the other side can be used for adhesion of the polyurethane layer.

The adhesion to the backing material may be carried out by conventional means, such as a nip roll or belt laminating means.

Generally, a curing is carried out after the completion of the preceding step. This curing may be achieved by standing the resulting product at a temperature of 10°C for 4 to 48 hours, preferably 5 to 24 hours, whereupon cross-linking of the polyurethane layer takes place resulting in a further increase in physical properties.

The releasing carrier sheet is then removed by stripping off from the polyurethane layer. The finished product thus produced may be subjected, if desired, to further finishing treatments such as embossing, crumpling, finish coating and the like.

The foamed layer of the finished product produced by the present invention has a texture of cells wherein the size of cells is diminishing outward.

Although the mechanism for the formation of such texture is not sufficiently clear in details, it may be explained as follows: The reaction between the urethane prepolymer containing terminal isocyanate groups and water includes the initiation, elongation and cross-linking reactions. The initiation and elongation reactions are those which are associated with bubbling of gaseous carbon dioxide, while the cross-linking reaction effects setting of the polymer on heating. According to the present invention, the above reactions may be controlled so that the foaming caused by the first two reactions reach an equilibrium, while the last cross-linking reaction remains unfinished. At this stage, the outer suface of the polyurethane layer is sufficiently adhesive, while the interior has a cellular structure comprising foam of 100 to 400$\mu$ in diameter which diminish towards the surfaces to 20 to 100$\mu$. In the accompanying drawing, there is shown a sectional view of the texture of the foamed polyurethane layer before or after incorporation with the backing material.

Figure 1:
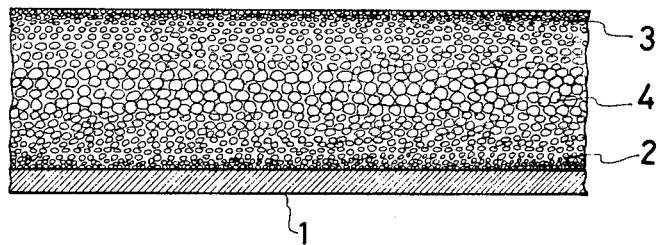
FIG. 1 is an enlarged sectional view of the polyurethane layer which was obtained by exposing the film of dope supported on the release carrier to a moisture-containing gas.
Figure 2:
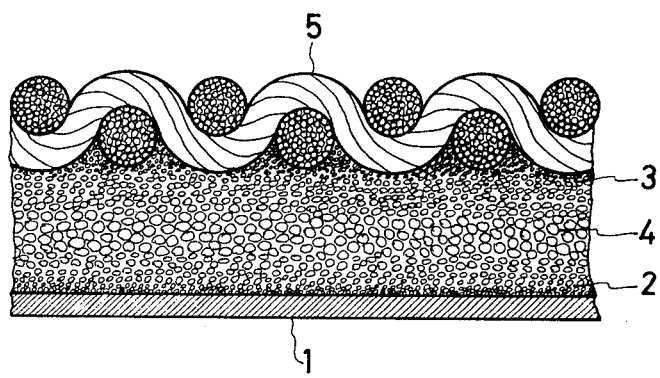
FIG. 2 is an enlarged sectional view of the layer of FIG. 1 after adhesion to a backing cloth.

As referred to FIG. 1, zone 2 which is adjacent the release carrier 1 and the surface zone 3 comprise very fine foam having a diameter of 20 to 100$\mu$ and the interior 4 contains foam of 100 to 400$\mu$ cellular diameter. After the backing cloth 5 is adhered to the layer as shown in FIG. 2, the surface zone 3 turns to an adhesive zone which is in engagement with the surface texture of the cloth. After the removal of release carrier 1, zone 2 becomes the surface zone of finished artificial leather. Thus the artificial leather produced by the present invention has an interior of cells having a diameter of 100 to 400$\mu$ surrounded by the outer zones of cells having a diameter of 20 to 100$\mu$. Consequently it has a sufficient abrasion resistance, scratch resistance and adhesion strength together with good flexibility. The product also has excellent weather-durability, especially in cold weather and is adapted for the production of various secondary articles such as shoes. The method of the present invention is especially advantageous in that the method is applicable to materials which tend to shrink upon heating, whereas such materials were not hitherto available for the production of artificial leathers.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. All parts and % in the examples are by weight.

EXAMPLE 1

A coating solution is prepared by dissolving 25 parts of polyurethane of the polyester type containing isophoronediisocyanate but no terminal isocyanate groups in the molecule, and 5 parts of pigment in 70 parts of dimethylformamide. This coating solution is applied to a release paper having silicon resin coating at a rate of 140 g/m². The paper is dried to remove dimethylformamide.

A solution of 100 parts of polyester type urethane prepolymer containing 5% terminal isocyanate groups (average MW=2,000) prepared by reacting polyethylene adipate having terminal hydroxy groups with toluylene-2,4-diisocyanate in 20 parts of methylenechloride and 3.5 parts of a solution comprising 80% of triethylenediamine, 3% of dimethylsiloxane and 17% of dimethylformamide are thoroughly mixed in a one-shot mixer. The resulting dope is heated to 30°C and then is applied to the release paper at a rate of 200 g/m² by a reverse coater. Succeedingly, a mild air blast containing 10g of water per m³ is applied to the coated surface at flow rate of 10 m³ per minute for 12 seconds and then the paper is passed through a dryer in which a moist air having a temperature of 100°C containing 10g of water per m³ is circulating for 1 minute. ($\beta=10.6\times10^{-3}$, $\beta x^{1.6}\omega t= 0.65$) The dope layer is placed on the unraised side of a raised polyethyleneterephthalate fabric ($\alpha=3.98$) and then adhered thereto. The release paper is stripped off after curing for 24 hours at 20°C whereby an artificial leather having physical properties as shown in Table 3 is obtained. The artificial leather thus obtained has a foamed polyurethane layer having a volume 2 times that of the unfoamed dope and an average cell size of 150μ. The product also has a smooth surface and an appearance similar to leather, and is especially adapted for uses in the production of various articles.

Table 3

| Properties | Product of Ex. 1 | Leather |
|---|---|---|
| Thickness (mm) | 0.70 | 0.75 |
| Hardness  longitudinal | 79 | 80 |
| (mg)  latitudinal | 59 | 70 |
| Scratch resistance (g) | 1200 | 1500 |
| Adhesion Strength (kg/cm) | 2.0 | 1.5 |
| Crumpling resistance (1000 time/kg) | not changed | not changed |
| Abrasion resistance (2000 times/500g) | not changed | not changed |
| Impact resistance at −30°C | passed | passed |
| Moisture permeability g/cm²/24 hours | 500 | >2400 |
| Flex resistance 10,000 times at−5°C | >3 | >3 |

In the above test, hardness, crumpling resistance, abrasion resistance, impact resistance and moisture permeability were measured according to methods of JIS-I-1079, JIS-K-6772, JIS-L-1004, JIS-K-6772 and JIS-Z-0208 respectively, and the scratch resistance, adhesion strength and flex resistance were measured by Clemense method, the methods using a tensile tester and flex fatigue tester respectively.

EXAMPLE 2

A release paper as used in Example 1 is embossed and is provided with a polyurethane coating as in Example 1. 100 parts of polyether type urethane prepolymer containing 10% of terminal isocyanate groups (average MW=2,000) prepared by reacting polytetramethyleneglycol with toluylene-2, 4-diisocyanate and 2.5 parts of a mixture of 75% of triethylendiamine and 25% of dimethylsiloxane are thoroughly mixed in a one-shot mixer. The resulting dope is heated to 40°C and then is applied to the release paper at a rate of 200 g/m² by a comma-doctor.

A moisture-containing air of 20 g/m³ moisture content is blown to the coated surface at a flow rate of 5 m³/minute. ($\beta=10.9\times10^{-3}$, $\beta x^{1.6}\omega t=0.6$) Then radiation of ultra-infrared rays is applied to the surface by an Infra-jet dryer for 1 minute at 140°C. The resulting polyurethane layer is place on a nylon/polyethyleneterephthalate nonwoven fabric ($\alpha=3.9$) impregnated with polyurethane resin, passed through nip rolls, and allowed to stand in a room at 40°C for 10 hours. The release paper is stripped off and the resulting product is finished by a printing roll, whereby artificial leather similar to that obtained in Example 1 is obtained. A camera case was made with the artificial leather thus produced. The case has excellent physical properties and appearance.

EXAMPLE 3

A solution of 100 parts of polyester type urethane prepolymer containing 4.5% of terminal isocyanate groups (average MW=2,000) made from polyethyleneadipate and toluylene-2,4-diisocyanate ("Coronate", Nippon Polyurethane Co., Ltd.) in 10 parts of methylenechloride and 3 parts of a solution containing 44% of triethylenediamine, 6% of dimethylsiloxane and 50% of methyl ethyl ketone are thoroughly mixed in a one-shot mixer. The resulting dope is heated to 30°C by a heat-exchanger and then is applied to a polyethyleneterephthalate film of 0.1mm thickness at a rate of 200 g/m² by an applicator. The dope layer supported by the film is placed in a room filled with a moisture containing air at a rate of 9.7g of water/m³ for 5 seconds at 25°C. Then the layer is heated in a dryer at the same humidity at a temperature of 140°C for 115 seconds. The resulting polyurethane layer is placed on a knitted cotton fabric, passed through nip rolls, and cured at 25°C for 24 hours. The polythyleneterephthalate film is stripped off and polymethylglutamate resin solution is applied to the surface of the resulting product. The artificial leather thus produced showed excellent properties as that obtained in Example 1. $\alpha=3.1$, $\beta=11.5\times10^{-3}$, $\beta x^{1.6}\omega t=0.35$ The same procedure is repeated except that dopes having various formulations as shown in Table 4 are used. The resulting products are tested in comparison with the product of Example 3. Table 4 shows the result obtained therefrom.

Table 4

| Formulation Part | Example 3 | Test A | Test B | Test C | Test D |
|---|---|---|---|---|---|
| urethane prepolymer | 100.00 | 100.00 | 100.00 | 100.00 | 100.00 |
| triethylenediamine | 1.32 | 20 | 0.22 | 1.32 | 1.32 |
| dimethylsiloxane | 0.18 | 2.8 | 0.06 | 0.02 | 3.36 |
| methylenechloride | 10.00 | 10.00 | 10.00 | 10.00 | 5.00 |
| methyl ethyl ketone | 1.5 | 3.00 | 1.5 | 1.5 | 1.5 |

Table 4-continued

| Formulation Part | Example 3 | Test A | Test B | Test C | Test D |
|---|---|---|---|---|---|
| Product |
| Adhesion strength (kg/cm) | 2.0 | — | 1.5 | 0.5 | 0.6 |
| Foaming rate(times) | 2.7 | 4.0 | 1.3 | 2.3 | 2.7 |
| Cell size  surface ($\mu$) | 20–100 | 300–500 | 20–50 | 100–500 | 20–100 |
|          interior | 100–300 | 500–1000 | 50–200 | 500–2000 | 100–300 |
| Remarks | — | overfoaming, impossible to apply | low foaming rate, insufficient flexibility | ununiform foaming, rough cells | bleeding of foam stabilizer |
| Scratch resistance (g) | 1200 | 300 | 1200 | 400 | 1200 |

The procedure of Example 3 is repeated except that the procedure is carried out at various conditions as tabled in Table 5 with respect to the moisture content $\omega$, amount of amine catalyst $x$, and exposure time to moist air $t$ The resulting products are tested in comparison with the product of Example 3. Table 5 shows the results obtained therefrom.

Table 5

| Reaction Condition | Example 3 | Test E | Test F | Test G | Test H | Test I | Test J |
|---|---|---|---|---|---|---|---|
| $\omega$(g) | 9.7 | 9.7 | 9.7 | 1.5 | 55 | 9.7 | 9.7 |
| $x$ (g) | 1.32 | 1.32 | 1.32 | 1.32 | 1.32 | 12 | 0.1 |
| $t$ (minute) | 2 | 0.03 | 100 | 2 | 2 | 2 | 2 |
| $\alpha-\beta x^{1.6} t$ | 2.75 | 3.1 | −14.3 | 3.05 | 1.1 | −8.6 | 3.07 |
| Product |
| Adhesion strength (kg/cm) | 1.5 | 1.5 | 0.02 | 1.5 | 0.05 | 0.03 | 1.5 |
| Scratch resistance (g) | 1200 | 1500 | 200 | 1500 | 300 | 300 | 1500 |
| Foaming rate (times) | 2.7 | 1.0 | 4.5 | 1.0 | 4.0 | 3.8 | 1.0 |
| Cell size  surface ($\mu$) | 20–100 | — | 20–100 | — | 100–300 | 100–300 | — |
|          interior | 100–300 | — | 100–300 | — | 300–1000 | 300–1000 | — |
| Remarks | | substantially no foaming, rigid | Substantially no adhesion | Substantially no foaming, rigid | Very weak adhesion | Very weak adhesion | Substantially no foaming |

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method for producing artificial leather which comprises:
    a. applying a dope comprising 100 parts by weight of a urethane prepolymer having an average molecular weight of 500–10,000 and containing about 2 to 10% by weight of terminal isocyanate groups, about 0.5 to 10 parts by weight of an amine catalyst and about 0.05 to 3 parts by weight of foam stabilizer dissolved in a hydrophobic solvent to a releasing carrier sheet;
    b. exposing the resulting coating layer to a moisture containing gas at an absolute humidity of from about 2 to 50 g/m³ and a temperature of 60°–200° C. for a sufficient period of time greater than 0.1 minute to produce microfoam in the coating layer;
    c. laminating said coating layer onto a backing material while it is adhesive;
    d. allowing the laminated layer to produce a polyurethane layer having a permanent adhesion with the backing material so that an adhesion strength of about 100 to 10,000 g/cm of the width of the transferred lay is obtained; and
    e. stripping off the carrier sheet therefrom.

2. The method of claim 1 in which the exposing step is carried out under conditions being in relation represented by the equation:

$$2 \leq \alpha - \beta x^{1.6} \omega t \leq 4$$

wherein $\alpha$ and $\beta$ are factors as defined in the foregoing description, $x$ is the amount (g) of amine catalyst in the dope, $\omega$ is the absolute humidity (g/m³) and $t$ is length of time (minutes) of the exposing.

3. The method of claim 1 in which the said urethane prepolymer is a polyester type having an average molecular weight of 800 to 3,000.

4. The method of claim 1 in which the said urethane prepolymer is a polyether type having an average molecular weight of 100 to 4,000.

5. The method of claim 1 in which the dope contains less than about 25 parts by weight of a solvent per 100 parts by weight of the urethane prepolymer.

6. The method of claim 1 in which the amine catalyst is trimethylenediamine.

7. The method of claim 1 in which the foam stabilizer is an organosiloxane.

8. The method of claim 1 in which the dope further contains a pigment, filler or mixture thereof.

9. The method of claim 1 in which the dope is mixed by a one-shot mixer.

10. The method of claim 1 in which the dope is maintained at a constant temperature between about 10°C and 40°C during application to said carrier sheet.

11. The method of claim 1 in which the moisture-containing gas is air.

12. The method of claim 1 in which the releasing carrier sheet is a release paper having a coating of a polyurethane resin thereon.

13. The method of claim 12 in which the polyurethane resin contains isophoronediisocyanate in the molecule.

14. The method of claim 1 in which the releasing carrier sheet is polyethyleneterephthalate film.

15. The method of claim 12 in which the release paper is further embossed.

16. The method of claim 1 in which the backing material is a raised fabric.

17. The method of claim 1 in which the backing material is a nonwoven fabric impregnated with polyurethane.

18. The method of claim 1 in which the backing material is a knitted fabric.

19. The method of claim 1 in which the polyurethane layer in adhesion with the backing material is further cured for about 4 to 38 hours at a temperature of about 10°C to 50°C following to the laminating step.

20. The method of claim 1 wherein, the final product is further applied with a finishing coating.

* * * * *